US008620730B2

(12) United States Patent
Cox et al.

(10) Patent No.: US 8,620,730 B2
(45) Date of Patent: Dec. 31, 2013

(54) PROMOTING PRODUCTS IN A VIRTUAL WORLD

(75) Inventors: Aaron R. Cox, Tucson, AZ (US); Brad M. Johnson, Raleigh, NC (US); Mary S. Johnson, Raleigh, NC (US); Thomas J. Sluchak, Raleigh, NC (US); Jeffrey J. Smith, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 104 days.

(21) Appl. No.: 12/969,536

(22) Filed: Dec. 15, 2010

(65) Prior Publication Data

US 2012/0158473 A1  Jun. 21, 2012

(51) Int. Cl.
G06Q 30/00 (2012.01)

(52) U.S. Cl.
USPC .......................................................... 705/14

(58) Field of Classification Search
USPC .......................................................... 705/14
See application file for complete search history.

(56) References Cited

U.S. PATENT DOCUMENTS

| 6,954,728 | B1 | 10/2005 | Kusumoto et al. |
| 6,968,315 | B1 | 11/2005 | Nakisa |
| 6,981,220 | B2 | 12/2005 | Matsuda |
| 2002/0007314 | A1 | 1/2002 | Maryuyama |
| 2009/0003355 | A1* | 1/2009 | Jain et al. ................... 370/400 |
| 2009/0048918 | A1 | 2/2009 | Dawson et al. |
| 2009/0076894 | A1 | 3/2009 | Bates et al. |
| 2009/0254430 | A1 | 10/2009 | Cherenson |
| 2009/0254495 | A1 | 10/2009 | Patwardhan et al. |
| 2010/0005007 | A1 | 1/2010 | Cox et al. |
| 2010/0017260 | A1 | 1/2010 | Hamilton |
| 2010/0023406 | A1 | 1/2010 | Bhogal et al. |
| 2010/0030578 | A1* | 2/2010 | Siddique et al. ................... 705/3 |
| 2010/0036735 | A1 | 2/2010 | Hamilton |
| 2010/0049613 | A1 | 2/2010 | Angles et al. |
| 2010/0058443 | A1 | 3/2010 | Bussani et al. |
| 2010/0125604 | A1* | 5/2010 | Martinez et al. ............... 707/784 |
| 2010/0217619 | A1 | 8/2010 | Cox et al. |
| 2011/0288666 | A1* | 11/2011 | Cheng ............................ 700/91 |

OTHER PUBLICATIONS

Jin, Seung-A Annie, Avatar-Based Advertising in Second Life: The Role of Presence and Attractiveness of Virtual Spokespersons, Fall 2009, Journal of Interactive Advertising, pp. 1-12.*

(Continued)

*Primary Examiner* — Alvin L Brown
(74) *Attorney, Agent, or Firm* — David W. Victor; Konrad, Raynes, Davda and Victor LLP (57) ABSTRACT

Provided are a computer program product, system, and method promoting products in a virtual world. An association of product information for a product with a texture of an object assigned to the advertising user is provided for an advertising user. The product information with the texture of the object is rendered to be observable by interacting users in the virtual world when the texture of the object presenting the product information is within an observable range of avatars of the interacting users. Tracking information is updated for the advertising user in response to the texture of the object presenting the product information being within the observable range of the avatars of the interacting users. The tracking information generated for the advertising user is provided for use in determining rewards to assign to the advertising user for promoting the product.

21 Claims, 7 Drawing Sheets

(56) References Cited

OTHER PUBLICATIONS

IBM "Method and Apparatus for Targeted Advertising in Alternate Reality Environments Based on Expressed Virtual Avatar Persona and End-User Social Profile", Oct. 14, 2009, pp. 1-2, IP.com No. IPCOM000188581D.

IBM ,"Web Artificial Intelligence Application (WAIP): Evolving, Personalizable, Webbased, Artificial Intelligence Companion", Dec. 15, 2009, pp. 1-2, IP.com No. IPCOM000191093D.

Wikipedia, "Economy of Second Life", (online) Sep. 7, 2010, retrieved from the Internet at < URL:http:www.en.wikipedia.org/wiki/Linden_dollars, 6 pp.

Kumar et al., "Second Life and the New Generation of Virtual Worlds", Dec. 27, 2008, 8 pp., published by IEEE Computer Society.

Oliver et al., "Virtual Worlds, Real Traffic: Interaction and Adaptation", Feb. 22, 2010, 12pp.

Seo et al., "Edge Indexing in a Grid for Highly Dynamic Virtual Environments", Oct. 23, 2006, 10 pp., Computer Scient Department University of Southern California.

Antonello et al., "Traffic Analysis and Synthetic Models of Second Life", 30 pp. Multimedia Systems 2008.

Wikipedia, "Second Life" (online) (retrieved on Nov. 5, 2010), retrieved from the internet at <URL http://en.wikipedia.org/wiki/Second_Life#Server, 18 pp.

Fernandes et al., "Traffic Analysis Beyond This World: the Case of Second Life", ACM 2007, 6 pp.

Wikipedia, "Server Architecture From Second Life Wiki", (online) (retrieved on Nov. 5, 2010), retrieved from the internet at <URL http:wiki.secondlife.com/wiki/Server_architecture, 2 pp.

Wikipedia, "Virtual World", (online) (retrieved on Nov. 5, 2010), retrieved from the internet at <URL http:en.wikipedia.org/w/index.php?title=Virtual_world&printable=yes, 13 pp.

\* cited by examiner

PROMOTING PRODUCTS IN A VIRTUAL WORLD

BACKGROUND OF THE INVENTION

1. Field of the Invention

The present invention relates to a computer program product, system, and method for promoting products in a virtual world.

2. Description of the Related Art

Virtual worlds, such as Massive Multiplayer Online Social Games and metaverse, are extremely popular, having millions of users. A virtual world is an interactive simulated environment accessed by multiple users, represented by avatars, through an online interface. Virtual worlds provide new levels of socialization, where users can experience sensations and interact with others in a similar way to real life. A virtual world can have anything one might encounter in the real world as well as objects and phenomena with no real-life counterparts. A virtual world provider has servers implementing simulation engines to render the virtual world and present to users over a network, such as the Internet.

SECOND LIFE® is a popular virtual world platform that offers its residents the opportunities for building new places, often comprised of terrain, buildings and objects, where users seek services just like in real life. (SECOND LIFE is a registered trademark of Linden Research, Inc.) Virtual worlds, such as SECOND LIFE, differ from traditional online games, where players have a particular goal to achieve and are limited to interact with the preexistent environment. Virtual worlds allow users to move freely on their own throughout the world without limitation, in an unscripted manner, and without predefined objectives.

Virtual worlds may also implement a virtual economy, including virtual currency. The virtual economy results from the interaction of participants in the virtual world. Participants may trade goods and use virtual currency to purchase assets of other participants in the virtual world. The value of objects in a virtual economy is usually linked to their usefulness and the difficulty of obtaining them. The investment of real world resources (time, membership fees, etc.) in acquisition of wealth in a virtual economy may contribute to the real world value of virtual objects.

Some real world businesses maintain virtual stores in a virtual world to advertise their products. This allows the users, through their virtual world avatar, to browse the latest and innovative products through the virtual world store, although purchase of the real world products would occur outside of the virtual world. Further, some clothing companies have provided virtual world access to virtual world representations of the clothing the companies sell in the real world, so avatars of users may wear and present representations of that clothing in the virtual world.

There is a need in the art for improved techniques for advertising products in a virtual world.

SUMMARY

Provided are a computer program product, system, and method promoting products in a virtual world. An association of product information for a product with a texture of an object assigned to the advertising user is provided for an advertising user. The product information with the texture of the object is rendered to be observable by interacting users in the virtual world when the texture of the object presenting the product information is within an observable range of avatars of the interacting users. Tracking information is updated for the advertising user in response to the texture of the object presenting the product information being within the observable range of the avatars of the interacting users. The tracking information generated for the advertising user is provided for use in determining rewards to assign to the advertising user for promoting the product.

DETAILED DESCRIPTION

Users in a virtual world may associate product information with objects they control in the virtual world, such as their avatar or fixed assets. When the objects associated with product information are observable to the avatars of other users in the virtual world, then that interaction with the object promoting the product is tracked. The tracked promotion activities may be used to assign rewards or credits to the user promoting the product through their objects in the virtual world.

Figure 1:
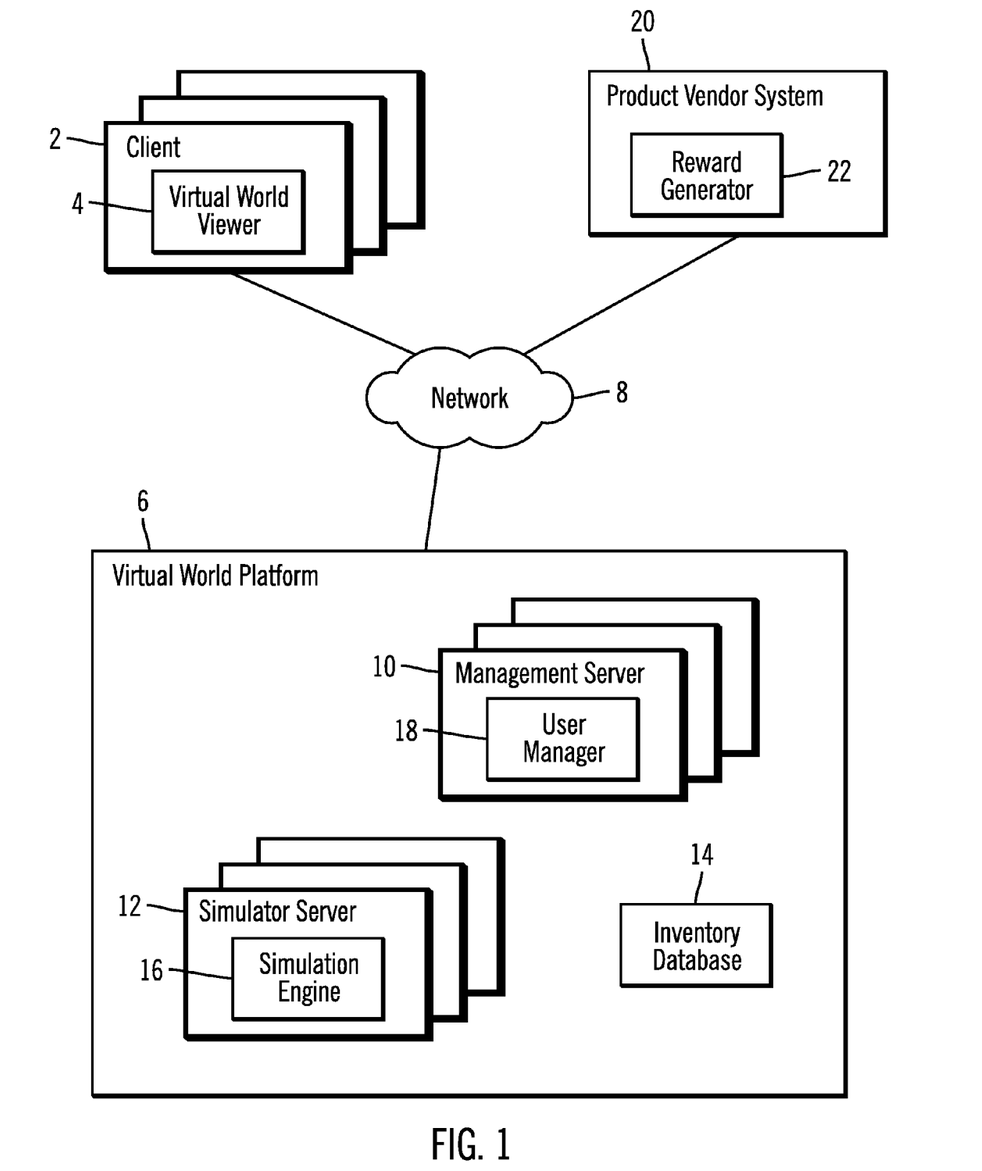
FIG. 1 illustrates an embodiment of a virtual world network environment.

FIG. 1 illustrates an embodiment of a virtual world network environment. The virtual world network includes a plurality of client systems 2 that each include a virtual world viewer 4 program to render a graphical user interface (GUI) to enable the user of the client 2 to interact in a virtual world rendered by a virtual world platform 6 over a network 8. The virtual world platform 6 includes management servers 10, simulator servers 12, and an inventory database 14 to render a virtual world, such as a Massive Multiplayer Online Social Game or a metaverse.

The systems in the virtual world platform 10 may be distributed across geographical locations and communicate over the Internet or dedicated high speed connections. The simulator servers 12 each include simulation engine 16 code to execute to render the virtual world environment for the clients 2. The simulation engine 16 in the simulator servers 12 renders the virtual world terrain, avatars and objects in the virtual world by rendering representations of objects, terrain and the environment in the viewers 4 of users interacting in the virtual world with an avatar. The simulation engines 16 in the simulator servers 12 further perform visibility computations on objects and land, physics simulation of objects, collision detection, messaging between avatars, maintaining the location and state of objects and avatars representing users interacting through viewers 4, and transmitting information to render to the client viewers 4. The simulator servers 12 further provide interaction and communication between avatars and objects in the region. In certain embodiments, different simulators 16 may be dedicated to specific regions in the virtual world being rendered.

The viewer 4 GUI renders locations of objects and their interaction with the avatar of the user in the virtual world. The viewer 4 may render three-dimensional (3D) graphics or two-dimensional (2D) graphics and sound.

The inventory database 14 may be comprised of one or more database servers and databases, such as distributed databases, including information on objects that may be rendered in the virtual world and user avatars. The simulator servers 12 access information, such as textures, shapes, etc., on objects from the inventory database 14 when ready to render in the virtual world.

The management servers 10 include user manager code 18 to handle such operations as user registration, login and authentication of users, instant messages between users, connections to the inventory database 18, billing information, etc.

A product vendor system 20 may receive information on tracking information with respect to a user and the products they promote for the vendor. The product vendor system 20 includes a reward generator 22 to determine how to assign real world or virtual world credits and rewards to users based on their product promotion activities in the virtual world.

The network 8 may comprise a Local Area Network (LAN), the Internet, Storage Area Network (SAN), Wide Area Network (WAN), wireless network, etc. The servers 10 and 12 may comprise an enterprise server, mainframe, server, etc., and the clients 2 may comprise a server, desktop computer, workstation, laptop, tablet computer, telephony device, personal digital assistant (PDA), etc., or other computing device.

Figure 4:
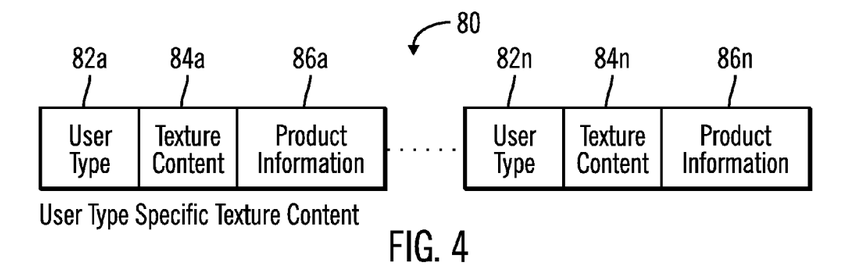
FIG. 4 illustrates an embodiment of user type specific texture content to apply to objects in the virtual world.
Figure 5:
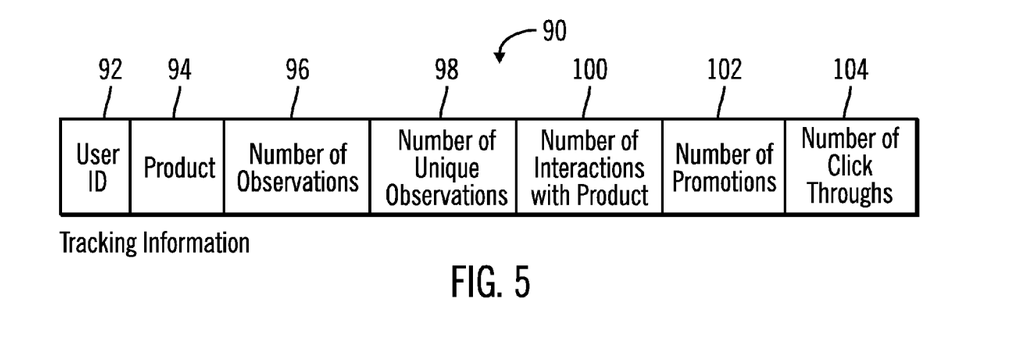
FIG. 5 illustrates an embodiment of tracking information to track observations and interactions with objects promoting products in the virtual world.

The inventory database 14 may include object information 50 (FIG. 2) for each object capable of being rendered in the virtual environment, texture information 60 (FIG. 3) comprising information on how to render the object, user type specific texture information (FIG. 4), and tracking information (FIG. 5).

Objects are rendered in the virtual world by rendering the textures of the object in the viewers 4. An object may comprise an avatar or a fixed asset assigned or owned by a user, such as real property, vehicles, buildings, items, jewelry, etc. An object is observable in the virtual world when determined by the simulator servers 12 to be within an observable range of an avatar of an interacting user interacting in the virtual world. An object in the observable range of an avatar of an interacting user is rendered in the viewer 4 of the user manipulating the avatar in the virtual word. One object may be within the observable range of multiple avatars and. Thus, a representation of that object is rendered in multiple viewers 4 of the users manipulating their avatars in the observable range. An object may be rendered in the viewer 4 of the user in the observable range of the object by causing the visual display of the object in the viewer 4, rendering a sound representing the object in the viewer 4, through a combination of display and sound, or other techniques for rendering an object, including techniques to make representations of an object accessible to disabled users.

Figure 2:
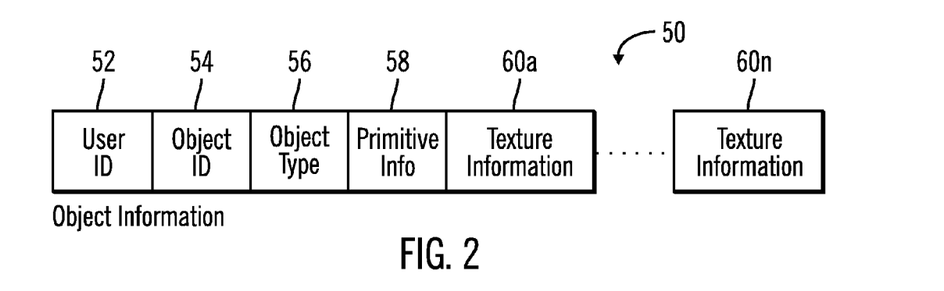
FIG. 2 illustrates an embodiment of object information maintained for objects in the virtual world.

FIG. 2 illustrates an embodiment of object information 50 maintained for each object capable of being rendered in the virtual world. The object information 50 for an object includes a user identifier 52 of the user registered in the virtual world that owns or is assigned the object, a unique object identifier (ID) 54 to uniquely identify the object in the inventory database 14, an object type indicating the type of object (e.g., avatar, vehicle, building, fixed asset, etc.), primitive information 58 for the object providing the shape of the object that may be rendered in 3D or 2D, and one or more instances of texture information $60a \ldots 60n$. Each texture information $60a \ldots 60n$ instance provides decorations for the object primitives, appearance, digitized audio clips, skins, text information, etc.

Figure 3:
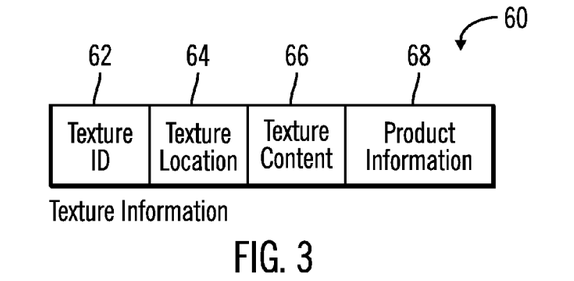
FIG. 3 illustrates an embodiment of texture information for textures to apply to objects in the virtual world.

FIG. 3 illustrates an embodiment of texture information 60, where texture information $60a \ldots 60n$ comprise instances of the texture information 60. The texture information 60 for a texture for an object includes a unique texture identifier (ID) 62, texture location information 64 providing a region of the shape primitive for an object at which the texture will be rendered, texture content 66 comprising a skin, graphics, digitized audio, that may be rendered at the texture location 64 on the object, and product information 68 associated with the texture. The product information 68 may comprise information on a product being promoted through the texture of the object, such as a logo, appearance, shape, sound that designates or represents the product being promoted, or textual, picture, video or sound providing information on the product. For instance, the product information 68 may include a network address, e.g., Universal Resource Locator (URL), of a web site of the product producer, a web site of a vendor that sells the product, advertising or marketing material on the product that may be rendered in the viewer or client 2 computer of the user interacting with the object.

In this way, advertising users promote a product in the virtual world through the texture content of their objects, including their avatar. The texture content may comprise a representation of the product itself in the object, i.e., such as an avatar object wearing clothes being promoted. Alternatively, the object may comprise the product, such as an automobile from a specific manufacturer that the avatar of the advertising user drives. Further, the object may operate as a billboard providing product information on the product.

FIG. 4 illustrates an embodiment of user type specific texture content 80, which may comprise the texture content 66 and product information 68 included with the texture information 60. The user type specific texture content 80 associates different texture content $84a \ldots 84n$ and different product information $86a \ldots 86n$ for different products with different types of users $82a \ldots 28n$. The user type $82a \ldots 82n$ may comprise one or more attributes of the personal profile of a user whose avatar is in the observable range of the object, such as gender, residence, occupation, age, religion, etc. The texture content $84a \ldots 84n$ for a user type $82a \ldots 82n$ specifies the texture to render for that user type, and the product information $86a \ldots 86n$ indicates the product information to present to the specific user having the user type $82a \ldots 82n$. For instance, for a male user type, the advertising user may select to render more male oriented texture content within the observable range of male user types and may select to render more female oriented texture content within the observable range of female user types. The user type specific texture content 80 allows the user to target the presentation of product information and products to different user types based on what the advertising user that owns the object believes will be of most interest to different user types. This allows the advertising user owning the object to optimize promotion activity to different types of users that will observe the object, e.g., fixed asset or avatar, owned by the advertising user based on the views and opinions of the advertising user.

Moreover, to the extent a user of a certain type has more interest in the product information being rendered, that user may further interact with the object and product information, resulting in additional rewards and credits to the advertising user.

In embodiments, where the texture information 60a ... 60n and user specific texture content 80 are for textures not associated with a product, then the texture information 60, 80 may not include product information for a product to promote.

FIG. 5 illustrates an embodiment of tracking information 90 maintained for one advertising user that has associated product information with an observable object of the advertising user in the virtual world. One advertising user may have multiple instances of the tracking information 90 for each product promoted, such as for each product that is promoted through one or more objects of the advertising user observable in the virtual world. The tracking information 90 includes the unique user ID 92 of the advertising user that is promoting the product through observable objects owned by the user 94, an identifier of the product 94 being promoted, e.g., clothing, jewelry, furniture, vehicles, etc. The tracking information 90 further includes a number of interacting users 96 that have been within the observable range of the object rendering the product 94 to that user. A number of unique observations 98 indicates a first time the object providing information on the product 4 is within the observable range of a particular user. The number of interactions with the product 100 indicates a number of times an interacting user has interacted with the object to obtain product information on the product 94 from the object, such as by the interacting user avatar selecting a particular piece of clothing worn by the avatar of the advertising user. A number of promotions 102 indicates a number of times the object has provided a promotion of the product to an interacting user, such as additional information on the product, company manufacturing or selling the product, and external URL links to the product. A number of click-throughs 104 indicates a number of time the interacting user interaction with the object has resulted in that user being directed to an Internet web site related to the product, such as web site where the product can be purchased, the web site of the company manufacturing or marketing the product, etc.

Figure 6:
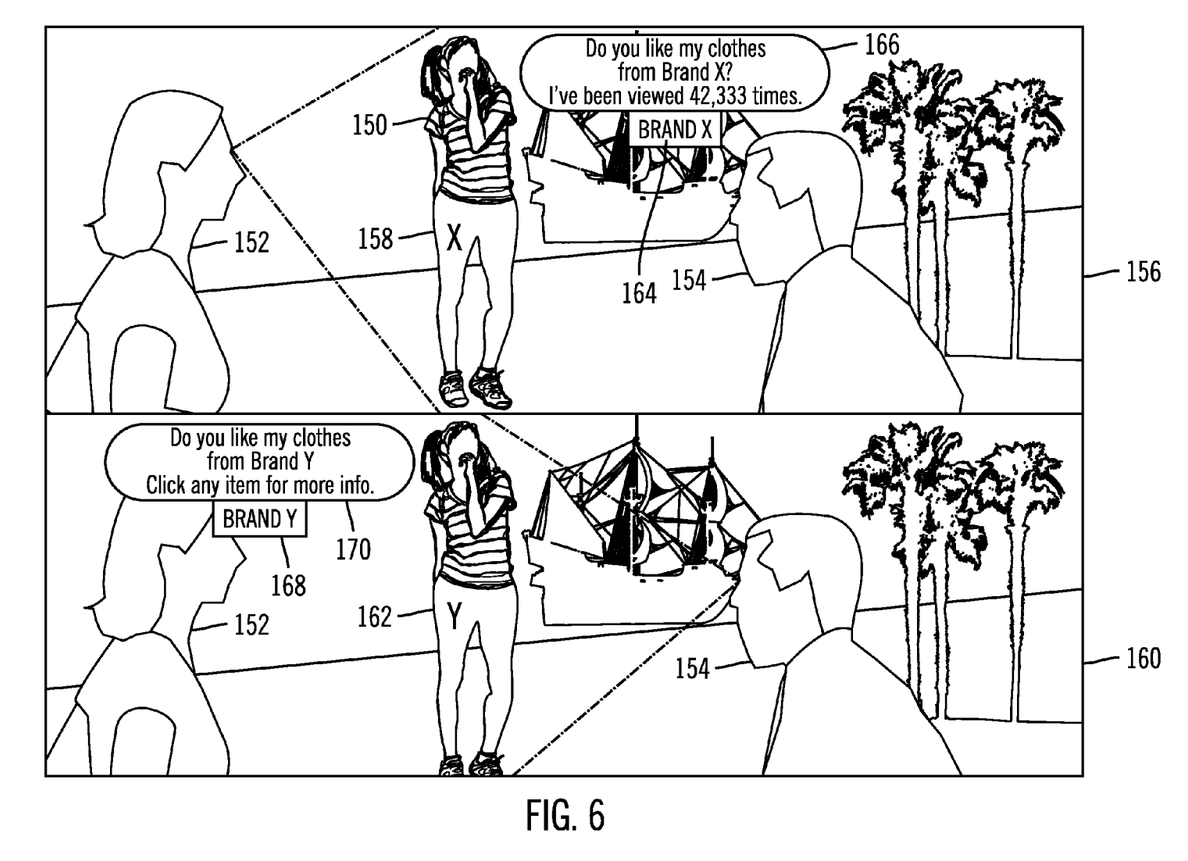
FIG. 6 provides an illustration of an avatar presenting product information in the virtual world.

FIG. 6 provides an illustration of how an object, in this case an avatar 150 of a user promoting a product, referred to as an advertising user, is rendered to different interacting users of avatars 152 and 154 that are within the observable range of the avatar 150. GUI panel 156 provides an example of the GUI displayed in the viewer 4 of the user of avatar 152 rendering the avatar 150 promoting Brand X pants 158. GUI panel 160 provides an example of the GUI displayed in the viewer 4 of the user of avatar 154 rendering the avatar 150 promoting Brand Y pants 162 in its viewer 4. The GUI panels 160 and 162 may be rendered simultaneously or at different times in the viewers 4 for the users represented by avatars 152 and 154. To implement the panels 156 and 160, the advertising user of avatar 150 may have user type specific context information 80 for the texture for the pants of the avatar 150 object. The user specific context information 80 may indicate for a female user type 82a to render the texture 158 for Brand X that presents product information 164 for Brand X when the female user 152 interacts with the pants texture. Further, the avatar 150 may promote the Brand X product in their text messages 166. Similarly, the user type specific context information 80 may indicate for a male user type 82n to render the texture 162 for Brand Y that presents product information 168 for Brand Y when the male user 154 interacts with the object rendering the pants texture. Further, the avatar 150 may promote the Brand Y product in their text messages 170.

Figure 7:
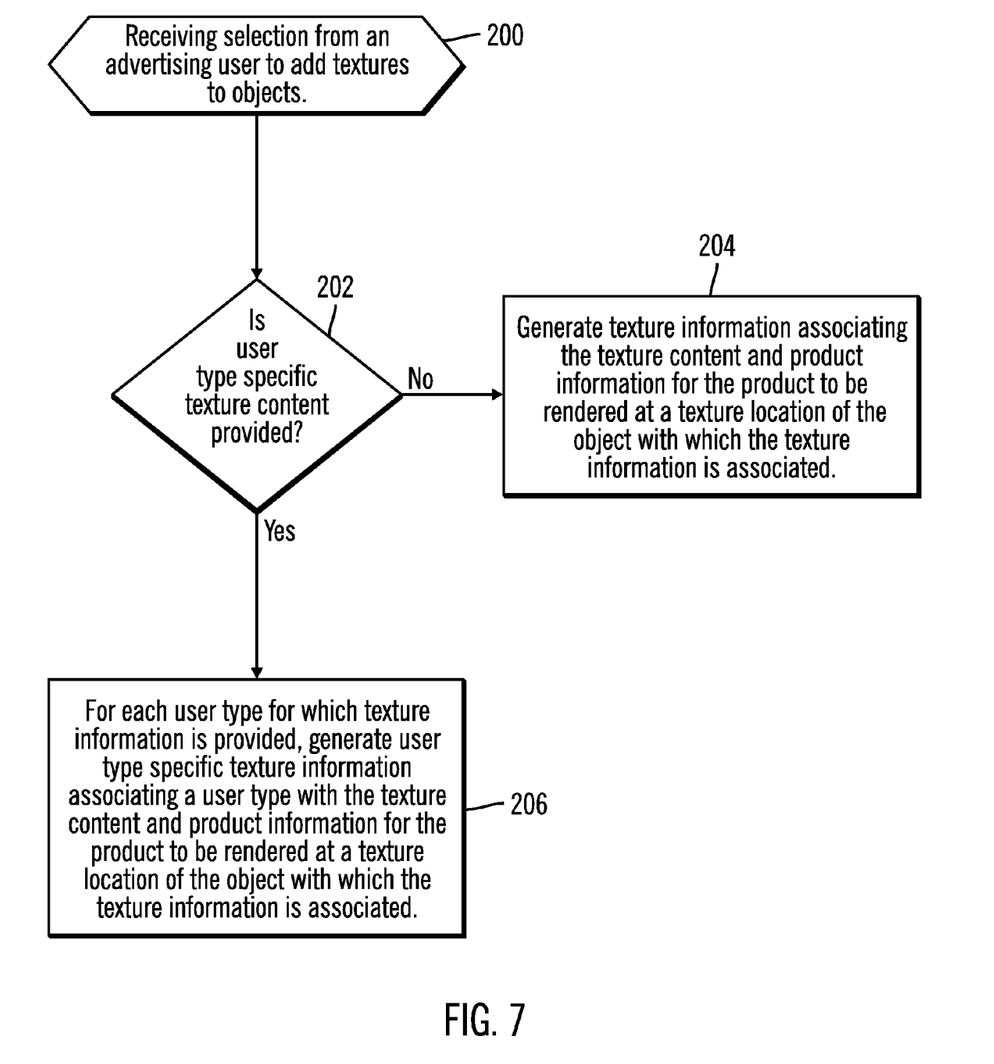
FIG. 7 illustrates an embodiment of operations to generate texture information for an object in the virtual world.

FIG. 7 illustrates an embodiment of operations performed by the user manager 18 program in the manager servers 10 to associate product information with objects of an advertising user to allow the advertising user to promote products to obtain credits and rewards. The user manager 18 receives (at block 200) selection from an advertising user to add textures to objects. In certain embodiments, the producer of the product may provide textures having the product information to users in the virtual world so they may associate with their objects to promote the product. If (at block 202) user type specific texture information 80 is not provided, i.e., the texture information for the product is to be presented to all users without regard to user type, then the user manager 18 generates (at block 202) texture information 60 associating the texture content 66 and product information 68 for the product to be rendered at a texture location 64 of the object 54 which with the texture information is associated. Multiple instances of texture information 60a ... 60n may be assigned to different locations of the 3D or 2D object. If (at block 202) user type specific texture information is provided, then the user manager 18 generates (at block 206), for each user type for which texture information is provided, user type specific texture information 80 associating a user type 82a ... 82n with the texture content 84a ... 84n and product information 86a ... 86n for the product to be rendered at a texture location 64 (FIG. 3) of the object 54 (FIG. 2) with which the texture information is associated.

Figure 8:
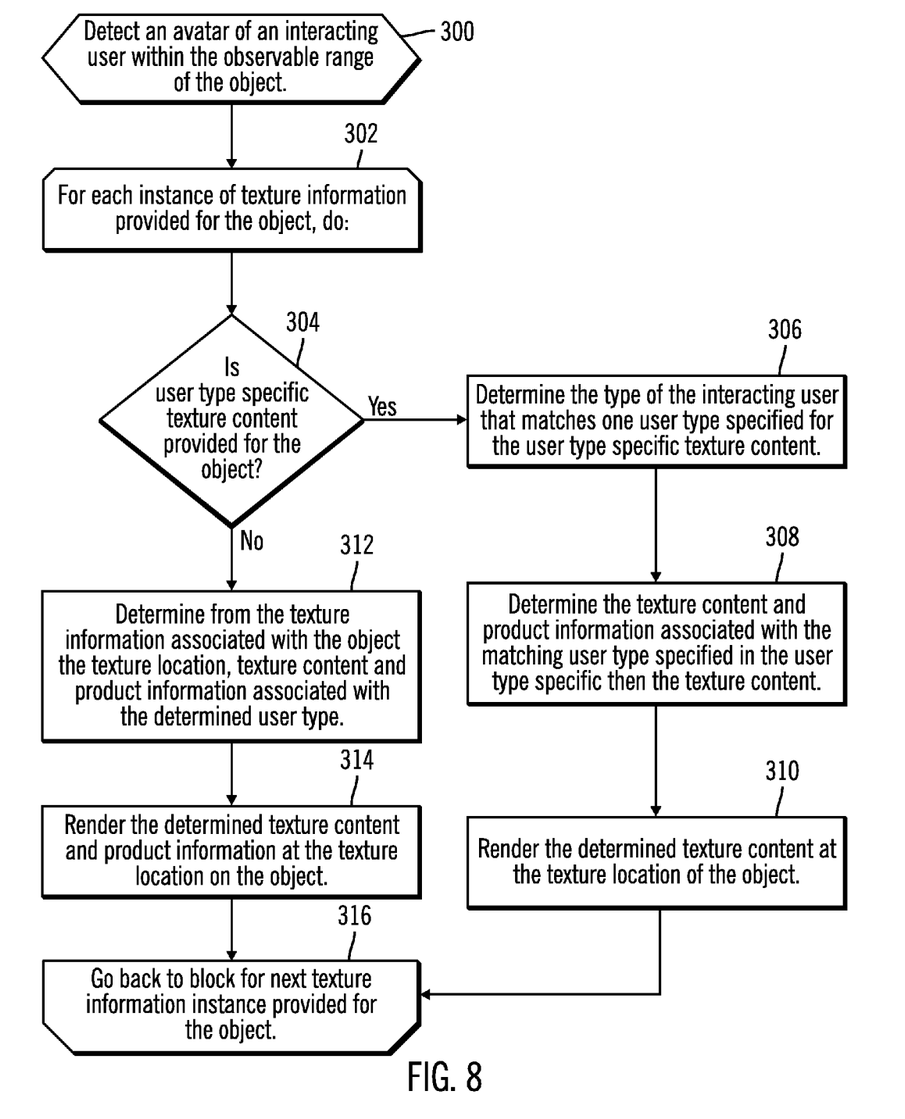
FIG. 8 illustrates an embodiment of operations to render an object in the virtual world.

FIG. 8 illustrates an embodiment of operations performed by the simulator engine 16 to render the texture information for an object, including texture information associated with product information to promote a product. In response to detecting (at block 300) an avatar of an interacting user within the observable range of the object 54, the simulation engine 16 performs a loop at blocks 302 through 316 of operations 304 through 314 for each instance of texture information 60a ... 60n provided for the object 54 (FIG. 2). If (at block 304) user specific texture content 80 (FIG. 4) is provided as the texture content 66 (FIG. 3) in the texture information 60a ... 60n, then the simulation engine 16 determines (at block 306) the type of the interacting user, which may comprise attributes of the user in the user profile for the user, that matches one user type 82a ... 82n specified for the user type specific texture content 80. The simulation engine 16 then determines (at block 308) the texture content 84a ... 84n and product information 86a ... 86n (if any) associated with the matching user type specified in the user type specific texture content 80, and renders (at block 310) the determined user type specific texture content 86a and product information 86a (if any) at the texture content location 64 of the object. If the user type of the user whose avatar is within observable range does not match a specified user type in the user type specific texture content 80, then the object may be displayed with a default texture.

If (at block 304) the texture content 66 is not user type specific, then the simulation engine 16 determines (at block 312) from the texture information 60 associated with the object, the texture location 64, texture content 66, and product information 68 (if any). The simulation engine 16 then renders (at block 314) the determined texture content 66 and product information 68 (if any) at the texture location 64 on the object.

Figure 9:
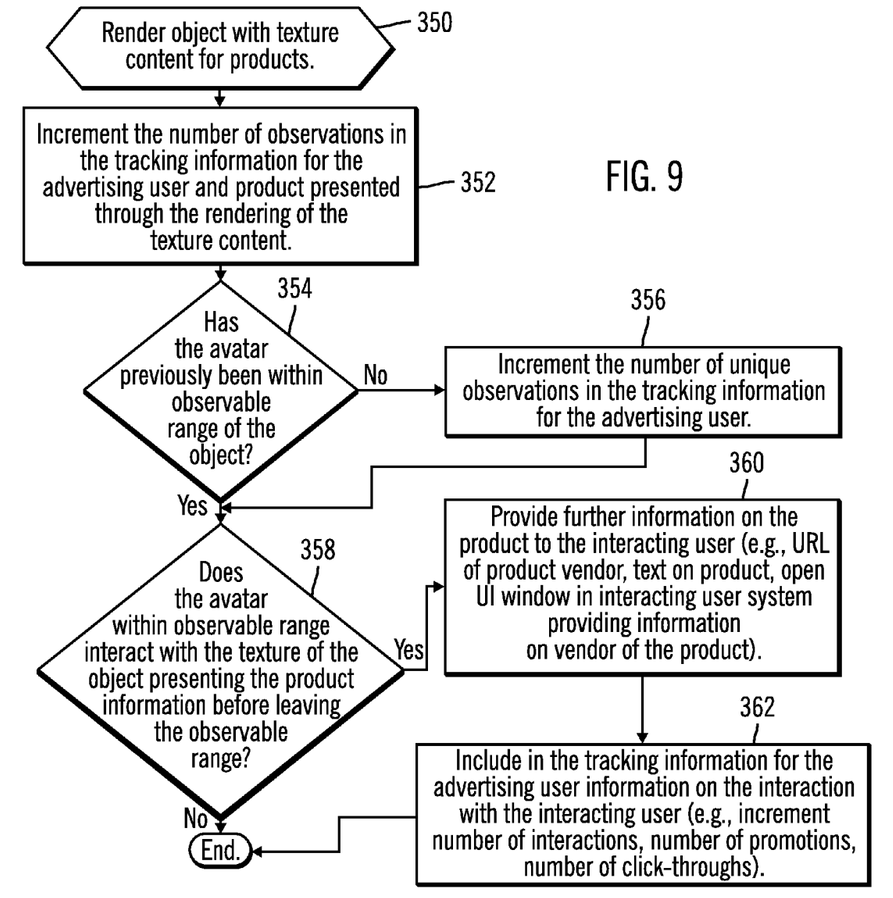
FIG. 9 illustrates an embodiment of operations to update tracking information related to observations and interactions with objects promoting products in the virtual world.

FIG. 9 illustrates an embodiment of operations performed by the simulation engine 16 to track information about rendered texture content having product information and product promotion activities of an advertising user. In response to rendering (at block 350) an object with texture content associated with a product (such as performed in FIG. 8), the simulation engine 16 increments (at block 352) the number of observations 96 in the tracking information 90 for the advertising user and the promoted product 94 presented through the rendering of the texture content. If (at block 354) the avatar was not previously within the observable range of the object, then the simulation engine increments (at block 356) the number of unique observations 98 in the tracking information 90 for the advertising user. From block 356 or if (at block 354) the avatar was previously within the observable range of the object, not a first time view, if the simulation engine 16 detects (at block 358) that the avatar within observable range interacts with the texture of the object presenting the product information, before leaving the observable range, then the simulation engine 16 provides (at block 360) further information on the product to the interacting user. This further information may be in the form of presenting the URL of the product vendor to the interacting user through the avatar, textual information on the promoted product, opening an Internet browser window in the interacting user client 2 or the viewer 4, providing information on the vendor of the product, etc. The simulation engine 16 includes (at block 362) in the tracking information 90 for the advertising user information on the interaction with the interacting user, such as by incrementing the number of interactions 100, number of promotions 102, number of click-throughs 104 depending on the user interaction or information the advertising user presents. If (at block 358) the avatar of the interacting user leaves the observable range of the object without interacting with the product, then control ends.

Figure 10:
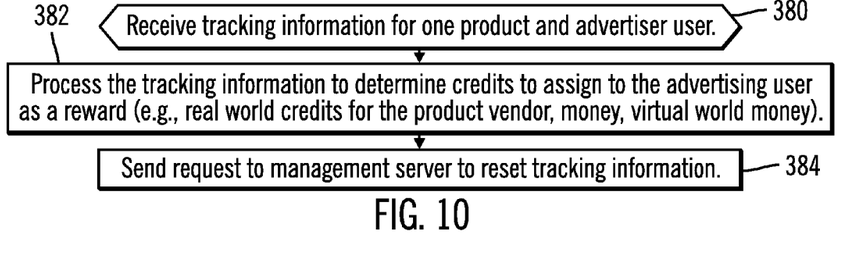
FIG. 10 illustrates an embodiment of operations to use the tracking information to issue awards for product promotions in the virtual world.

FIG. 10 illustrates an embodiment of operations performed by the reward generator 20 of the product vendor system 20 to reward advertising users for their product promotion activities in the virtual world. Upon receiving (at block 380) the tracking information for one product and an advertising user, the reward generator 22 process (at block 382) the tracking information to determine credits to assign to the advertising user as a reward. The reward generator 22 may assign different levels of credits depending on the number of observation 96, unique observations 98, number of advertising user promotions 102 beyond observation of the product information, and number of click-throughs 104 by interacting users to the product vendor website or to a web site to purchase the product. The credits may include real world credits for the product vendor to allow the advertising user to purchase products of the product vendor in the real world, direct real world cash payments, virtual money for use in the virtual world economy or other assets the advertising user may use in the virtual world, such as virtual world property, skins, items, etc. In an alternative embodiment, the virtual world management server 10 or other component may execute the reward generator 22 to determine rewards to assign to the advertising user. Further, an outside service may execute the reward generator 22 to determine rewards for users in the virtual server for may different advertisers. After calculating and disbursing the rewards, the reward generator 22 may send (at block 384) request to the management server 10 to reset the tracking information for that user and product.

Described embodiments enable a user in a virtual world to associate product information with textures to objects the user controls and presents in the virtual world. Further, the virtual world system tracks the interaction of avatars with the objects presenting product information to determine rewards and credits to provide to the advertising user that configures objects in the virtual world to promote the product. The credits offered to advertising users in the virtual world may include credits for products the advertising user may redeem in the real world or credits in the virtual world economy, such as virtual world dollars, virtual world assets, etc.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 11:
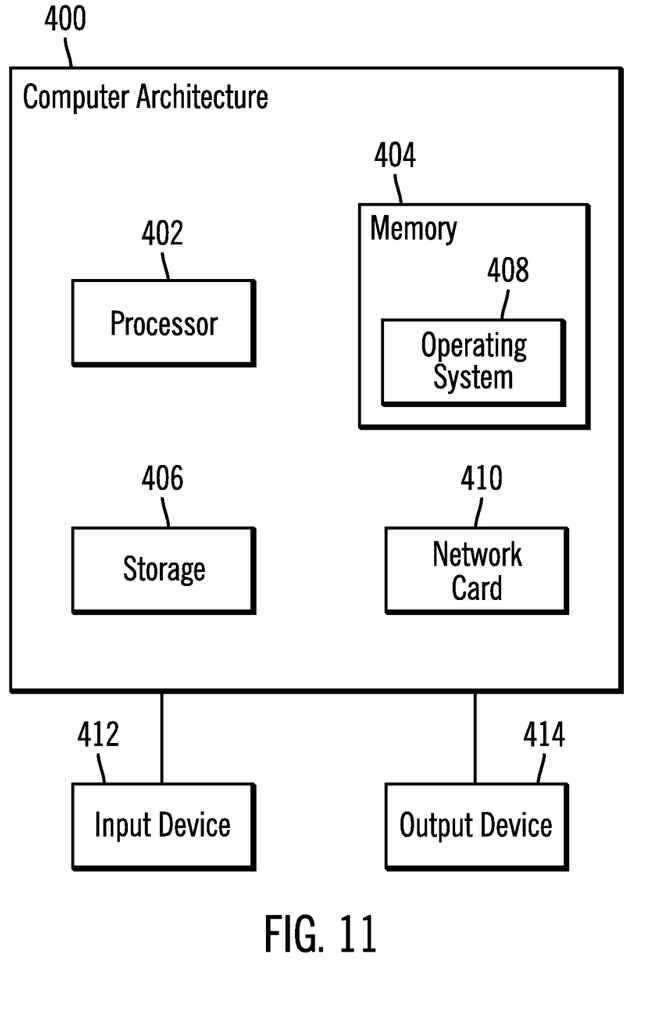
FIG. 11 illustrates an embodiment of a computer architecture.

FIG. 11 illustrates an embodiment of a computer architecture 400 that may be implemented in the client systems 2, the simulator server 12, management sever 10, inventory database 14, and product vendor system 20 in FIG. 1. The architecture 400 may include a processor 402 (e.g., a microprocessor), a memory 404 (e.g., a volatile memory device), and storage 406 (e.g., a non-volatile storage, such as magnetic disk drives, optical disk drives, a tape drive, etc.). The storage 406 may comprise an internal storage device or an attached or network accessible storage. Programs, including an operating system 408 and the viewer 4, simulation engine 16, user manager 18, and reward generator 22 are maintained in the storage 406 of the respective systems 2, 10, 12, 20 and loaded into the memory 404 and executed by the processor 402 of the respective systems 2, 10, 12, and 20. The architecture further includes a network card 410 to enable communication with the network 8. An input device 412 is used to provide user input to the processor 402, and may include a keyboard, mouse, pen-stylus, microphone, touch sensitive display screen, or any other activation or input mechanism known in the art. An output device 414 is capable of rendering information transmitted from the processor 402, or other component, such as a display monitor, printer, storage, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 7, 8, 9, and 10 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product including a simulation engine for implementing a virtual world, the computer program product comprising a computer readable storage medium having computer readable program code embodied therein that executes to perform virtual world operations, the operations comprising:

providing, for an advertising user, an association of product information for a product with a texture of an object assigned to the advertising user;

rendering, by the simulation engine, the product information with the texture of the object to be observable by interacting users in the virtual world when the texture of the object presenting the product information is within an observable range of avatars of the interacting users;

in response to the simulation engine rendering the product information with the texture of the object within the observable range of the avatars of the interacting users, updating tracking information for the advertising user by incrementing a number of observations for the product, wherein the texture of the object is within the observable range of the avatars of the interacting users when rendered in viewers of the users manipulating the avatars in the virtual world; and providing the tracking information including the number of observations of the product generated for the advertising user for use in determining rewards to assign to the advertising user for promoting the product.

2. The computer program product of claim 1, wherein the product information with the texture of the object is rendered and observable while the object is moving through the virtual world.

3. The computer program product of claim 2, wherein the object comprises an avatar of the advertising user, and wherein the product information rendered with the texture comprises clothing rendered on the avatar, wherein the virtual world operations further comprise:

receiving interaction from one of the interacting users with respect to the clothing presented on the avatar;

providing, by the avatar of the advertising user, contact information for a vendor of the clothing to the interacting user; and including in the tracking information for the advertising user information on the interaction with the interacting user with respect to the clothing and information on the promotion of the product to the interacting user.

4. The computer program product of claim 1, wherein the virtual world operations further comprise:

receiving interaction from one of the interacting users with respect to the product information presented in the texture of the object;

providing, by the advertising user, further information on the product to the interacting user in response to the received interaction; and including, in the tracking information for the advertising user, information on the received interaction and the further information on the product provided to the interacting user in response to the interacting user.

5. The computer program product of claim 1, wherein the received interaction comprises one of the interacting user selecting with a user interface the product information presented in the texture of the object and the interacting user communicating with the advertising user through interacting with the object, and wherein the provided further information includes an internet address of a web site promoting the product represented in the product information.

6. The computer program product of claim 1, wherein the tracking information generated for the advertising user promoting the product with respect to the object includes a number of interacting users whose avatar had the product information rendered within their observable range and a number of interacting users that interacted with the object to obtain further information on the product.

7. The computer program product of claim 6, wherein the determining the rewards to assign to the advertising user comprises:

assigning the rewards to the advertising user based on the number of interacting users whose avatar had production information rendered with the object in their view and the number of interacting users that obtained further information on the object.

8. The computer program product of claim 1, wherein the virtual world operations further comprise:

providing, for the texture of the object, an association of a first texture and first product information for a first product for a first type of user and an association of a second texture and second product information for a second product for a second type of user; and wherein rendering the product information with the texture of the object comprises:

determining for each of the interacting users a type of the interacting user that matches one of the first or second type of user indicated in the association provided for the texture of the object;

rendering the first texture having the first product information with the object in response to the determined type comprising the first type; and rendering the second texture having the second product information with the object in response to the determined type comprising the second type.

9. The computer program product of claim 1, wherein the object comprises a fixed asset owned by the advertising user in the virtual world, wherein the interacting users can interact with the fixed asset without the avatar of the advertising user being rendered in the view of the avatar of the interacting user.

10. A system for implementing a virtual world in communication over a network with client computers having viewers, comprising:

a processor; and a computer readable medium having code, including a simulation engine, executed by the processor to perform virtual world operations, the operations comprising:

accessing, for an advertising user, an association of product information for a product with a texture of an object assigned to the advertising user;

rendering, by the simulation engine, the product information with the texture of the object to be observable by interacting users in the virtual world when the texture of the object presenting the product information is within an observable range of avatars of the interacting users;

in response to the simulation engine rendering the product information with the texture of the object within the observable range of the avatars of the interacting users, updating tracking information for the advertising user by incrementing a number of observations for the product, wherein the texture of the object is within the observable range of the avatars of the interacting users when rendered in viewers of the users manipulating the avatars in the virtual world; and providing the tracking information including the number of observations of the product generated for the advertising user for use in determining rewards to assign to the advertising user for promoting the product.

11. The system of claim 10, wherein the product information with the texture of the object is rendered and observable while the object is moving through the virtual world.

12. The system of claim 11, wherein the object comprises an avatar of the advertising user, and wherein the product information rendered with the texture comprises clothing rendered on the avatar, wherein the virtual world operations further comprise:
- receiving interaction from one of the interacting users with respect to the clothing presented on the avatar;
- providing, by the avatar of the advertising user, contact information for a vendor of the clothing to the interacting user; and
- including in the tracking information for the advertising user information on the interaction with the interacting user with respect to the clothing and information on the promotion of the product to the interacting user.

13. The system of claim 10, wherein the virtual world operations further comprise:
- receiving interaction from one of the interacting users with respect to the product information presented in the texture of the object;
- providing, by the advertising user, further information on the product to the interacting user in response to the received interaction; and
- including, in the tracking information for the advertising user, information on the received interaction and the further information on the product provided to the interacting user in response to the interacting user.

14. The system of claim 10, wherein the tracking information generated for the advertising user promoting the product with respect to the object includes a number of interacting users whose avatar had the product information rendered within their observable range and a number of interacting users that interacted with the object to obtain further information on the product.

15. The system of claim 10, wherein the virtual world operations further comprise:
- providing, for the texture of the object, an association of a first texture and first product information for a first product for a first type of user and an association of a second texture and second product information for a second product for a second type of user; and
- wherein rendering the product information with the texture of the object comprises:
  - determining for each of the interacting users a type of the interacting user that matches one of the first or second type of user indicated in the association provided for the texture of the object;
  - rendering the first texture having the first product information with the object in response to the determined type comprising the first type; and
  - rendering the second texture having the second product information with the object in response to the determined type comprising the second type.

16. A method for implementing a virtual world, comprising:
- providing, for an advertising user, an association of product information for a product with a texture of an object assigned to the advertising user in a computer readable storage media;
- rendering in a server the product information with the texture of the object to be observable by interacting users in the virtual world when the texture of the object presenting the product information is within an observable range of avatars of the interacting users;
- in response to the rendering the product information with the texture of the object within the observable range of the avatars of the interacting users, updating tracking information for the advertising user by incrementing a number of observations for the product updating tracking information for the advertising user by incrementing a number of observations for the product, wherein the texture of the object is within the observable range of the avatars of the interacting users when rendered in viewers of the users manipulating the avatars in the virtual world; and
- providing the tracking information including the number of observations of the product generated for the advertising user for use in determining rewards to assign to the advertising user for promoting the product.

17. The method of claim 16, wherein the product information with the texture of the object is rendered and observable while the object is moving through the virtual world.

18. The method of claim 17, wherein the object comprises an avatar of the advertising user, and wherein the product information rendered with the texture comprises clothing rendered on the avatar, further comprising:
- receiving interaction from one of the interacting users with respect to the clothing presented on the avatar;
- providing, by the avatar of the advertising user, contact information for a vendor of the clothing to the interacting user; and
- including in the tracking information for the advertising user information on the interaction with the interacting user with respect to the clothing and information on the promotion of the product to the interacting user.

19. The method of claim 16, further comprising:
- receiving interaction from one of the interacting users with respect to the product information presented in the texture of the object;
- providing, by the advertising user, further information on the product to the interacting user in response to the received interaction; and
- including, in the tracking information for the advertising user, information on the received interaction and the further information on the product provided to the interacting user in response to the interacting user.

20. The method of claim 16, wherein the tracking information generated for the advertising user promoting the product with respect to the object includes a number of interacting users whose avatar had the product information rendered within their observable range and a number of interacting users that interacted with the object to obtain further information on the product.

21. The method of claim 16, further comprising:
- providing, for the texture of the object, an association of a first texture and first product information for a first product for a first type of user and an association of a second texture and second product information for a second product for a second type of user; and
- wherein rendering the product information with the texture of the object comprises:
  - determining for each of the interacting users a type of the interacting user that matches one of the first or second type of user indicated in the association provided for the texture of the object;
  - rendering the first texture having the first product information with the object in response to the determined type comprising the first type; and
  - rendering the second texture having the second product information with the object in response to the determined type comprising the second type.

* * * * *